(12) United States Patent
Roden

(10) Patent No.: US 9,434,049 B2
(45) Date of Patent: Sep. 6, 2016

(54) APPARATUS AND METHOD FOR PROVIDING A MODULAR ABRASIVE BLASTING AND RECOVERY SYSTEM

(71) Applicant: Reco Atlantic, LLC, Baltimore, MD (US)

(72) Inventor: John Russell Roden, Bel Air, MD (US)

(73) Assignee: Atlantic Design, Inc., Baltimore, MD (US)

( * ) Notice: Subject to any disclaimer, the term of this patent is extended or adjusted under 35 U.S.C. 154(b) by 9 days.

(21) Appl. No.: 14/630,396

(22) Filed: Feb. 24, 2015

(65) Prior Publication Data

US 2015/0209935 A1 Jul. 30, 2015

Related U.S. Application Data

(62) Division of application No. 13/605,295, filed on Sep. 6, 2012, now Pat. No. 8,961,270.

(60) Provisional application No. 61/531,356, filed on Sep. 6, 2011.

(51) Int. Cl.
*B24C 3/06* (2006.01)
*B24C 9/00* (2006.01)

(52) U.S. Cl.
CPC .............. *B24C 3/065* (2013.01); *B24C 3/06* (2013.01); *B24C 9/006* (2013.01); *Y02P 70/179* (2015.11); *Y10T 29/49826* (2015.01)

(58) Field of Classification Search
CPC ......... B24C 3/065; B24C 3/06; B24C 9/006; Y10T 29/49826; Y02P 70/179
See application file for complete search history.

(56) References Cited

U.S. PATENT DOCUMENTS

| | | | | |
|---|---|---|---|---|
| 1,934,389 A * | 11/1933 | Ulsh | ................. | B65D 19/0075 108/53.3 |
| 3,034,263 A * | 5/1962 | McDaniel | ............. | B24C 7/0046 451/100 |
| 3,237,351 A * | 3/1966 | Millhiser | ................ | B03B 5/623 451/102 |
| 3,559,343 A * | 2/1971 | Foster | ....................... | B24C 3/06 451/92 |
| 3,581,441 A | 6/1971 | Hulbert, Jr. | | |
| 4,075,789 A * | 2/1978 | Dremann | .............. | B24C 7/0069 451/101 |
| 4,326,362 A * | 4/1982 | Williams | .................. | B24C 3/00 451/80 |
| 4,449,331 A * | 5/1984 | MacMillan | ............... | B24C 3/00 451/88 |
| 4,561,219 A * | 12/1985 | Harada | ................... | B24C 1/083 414/788.4 |
| 4,563,841 A | 1/1986 | Hart et al. | | |
| 4,827,678 A * | 5/1989 | MacMillan | ............. | B24C 1/086 451/39 |
| 4,907,379 A * | 3/1990 | MacMillan | ............... | B24C 3/14 451/84 |
| 4,993,200 A * | 2/1991 | Morioka | ................. | B24C 3/065 451/88 |
| 5,039,002 A * | 8/1991 | Spamer | ................ | B65D 5/2038 206/429 |

(Continued)

*Primary Examiner* — George Nguyen
(74) *Attorney, Agent, or Firm* — Berenato & White, LLC

(57) ABSTRACT

A modular abrasive particle blasting system comprises an abrasive blast assembly including at least one blast vessel for delivering blast particles to an abrasive blasting system. The abrasive blast assembly is mounted within a first skid. An abrasive recycling assembly includes at least one vacuum hopper for receiving grit retrieved from an abrasive blasting process. The abrasive recycling assembly is mounted within a second skid. The first and second skids comprise mounting members at a top section and a bottom section of each of the first and second skids to permit mounting of the first and second skids in alternate stacked arrangements whereby the first skid is selective mounted above and below the second skid. The same skid principal may be used to provide a variety of skids, including blast skid, vacuum skid, recycle skid, storage skid, air dryer skid, dust collector skid and or dehumidification skid.

1 Claim, 22 Drawing Sheets

(56) References Cited

U.S. PATENT DOCUMENTS

| | | | | |
|---|---|---|---|---|
| 5,195,640 A * | 3/1993 | Seaverns | ............... | B07B 4/06 |
| | | | | 209/135 |
| 5,212,911 A * | 5/1993 | Benson | ............... | B24C 3/06 |
| | | | | 451/100 |
| 5,269,424 A * | 12/1993 | Lyras | ............... | B24C 9/006 |
| | | | | 209/2 |
| 5,353,729 A | 10/1994 | Goldbach et al. | | |
| 5,456,190 A * | 10/1995 | Good | ............... | B65D 19/44 |
| | | | | 108/53.3 |
| 5,520,288 A * | 5/1996 | Drenter | ............... | B07B 1/005 |
| | | | | 209/12.1 |
| 5,529,530 A * | 6/1996 | McPhee | ............... | B24C 3/06 |
| | | | | 451/38 |
| 5,545,074 A * | 8/1996 | Jacobs | ............... | B24C 3/065 |
| | | | | 451/102 |
| 5,657,876 A | 8/1997 | Drenter et al. | | |
| 5,683,030 A * | 11/1997 | Moore | ............... | B65F 1/0053 |
| | | | | 206/459.5 |
| 6,102,157 A | 8/2000 | Goldbach et al. | | |
| 7,581,643 B2 * | 9/2009 | Wilskey | ............... | B65D 33/105 |
| | | | | 206/278 |
| 8,961,270 B2 * | 2/2015 | Roden | ............... | B24C 3/06 |
| | | | | 451/100 |
| 2003/0118430 A1 * | 6/2003 | Braaten | ............... | B65G 57/112 |
| | | | | 414/659 |
| 2005/0061367 A1 * | 3/2005 | Barr | ............... | G05D 11/135 |
| | | | | 137/93 |
| 2008/0280537 A1 * | 11/2008 | Urban | ............... | B08B 9/00 |
| | | | | 451/36 |
| 2009/0098810 A1 * | 4/2009 | Mase | ............... | B24C 9/00 |
| | | | | 451/88 |
| 2009/0241999 A1 * | 10/2009 | Crocker | ............... | B08B 3/024 |
| | | | | 134/111 |
| 2010/0323588 A1 | 12/2010 | Benson | | |
| 2013/0026057 A1 * | 1/2013 | Shapiro | ............... | B65D 21/0212 |
| | | | | 206/459.5 |

* cited by examiner

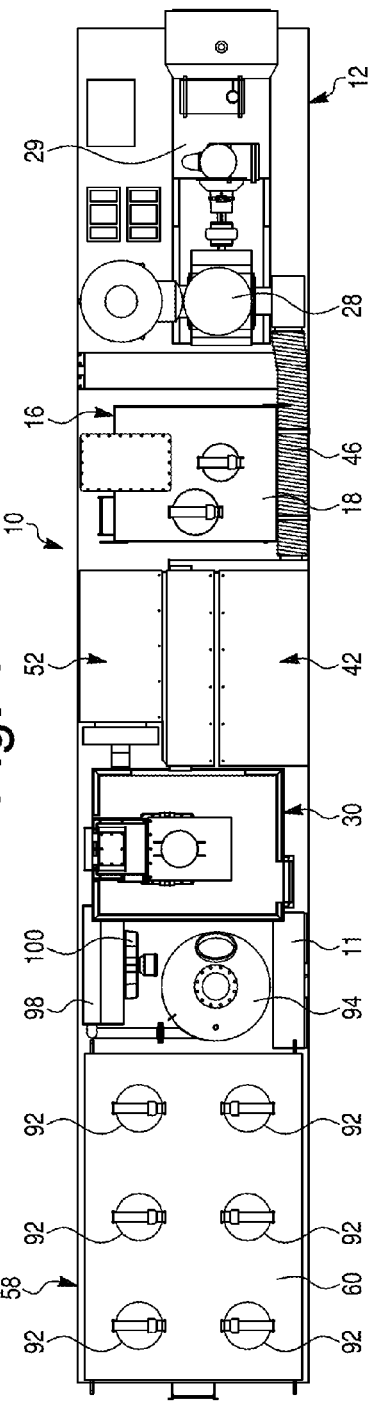
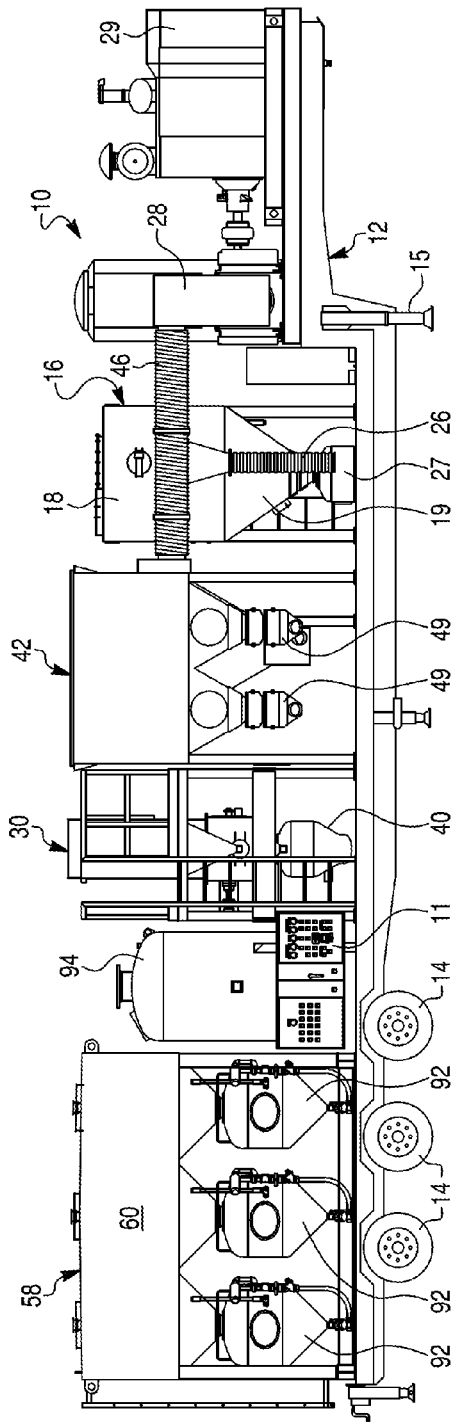

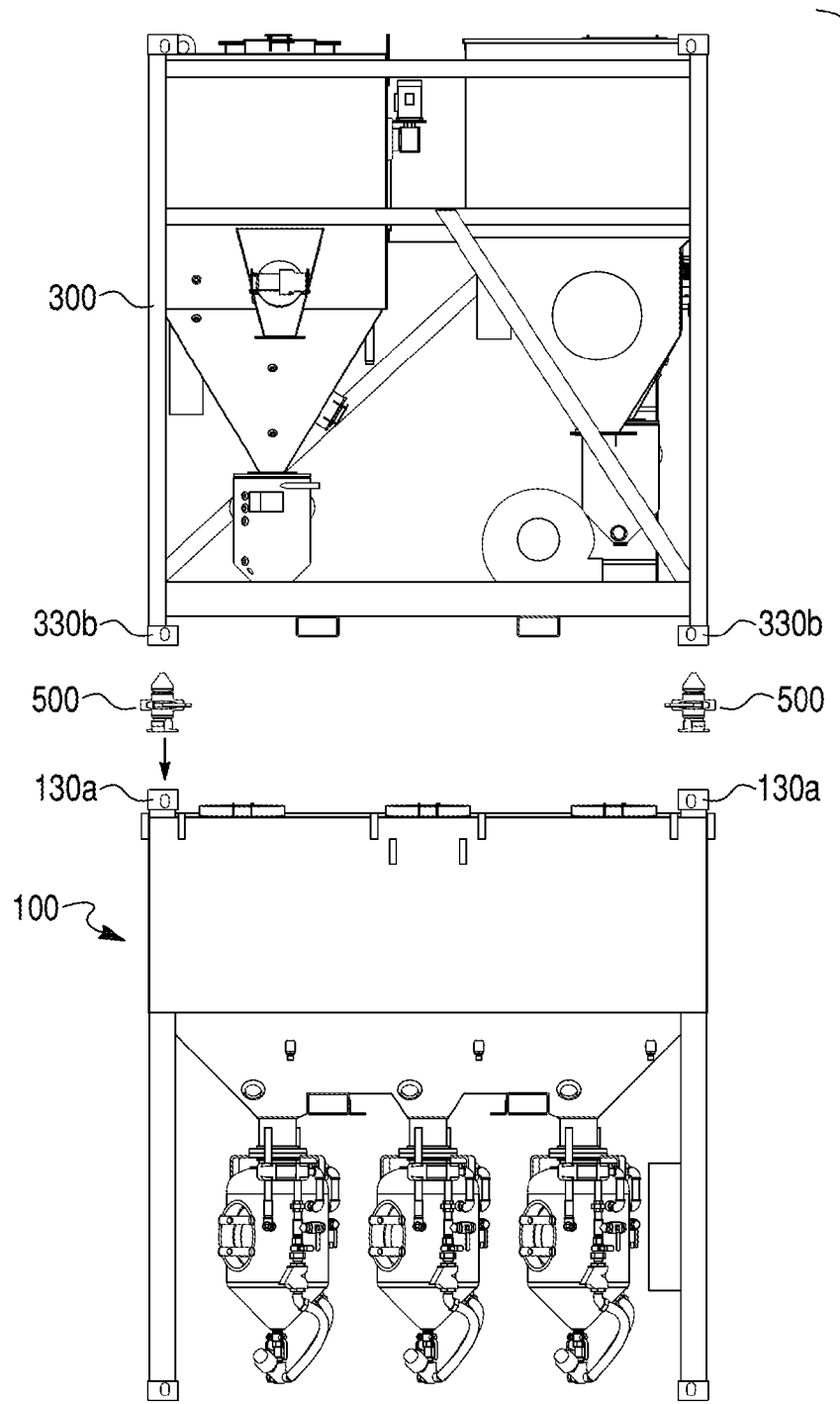

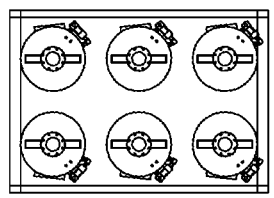
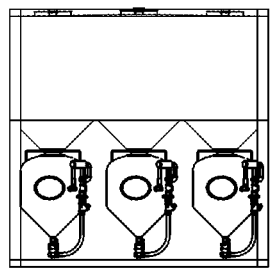
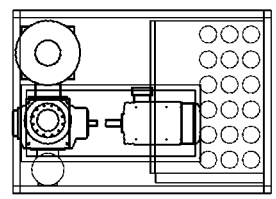
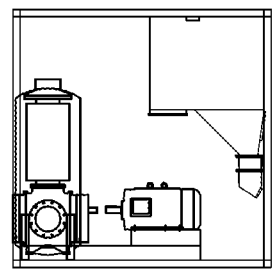
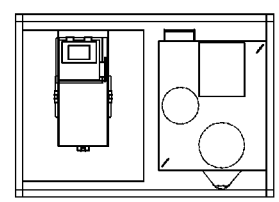
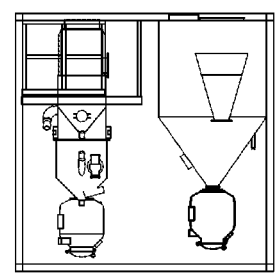
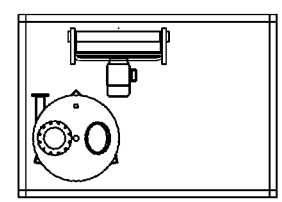
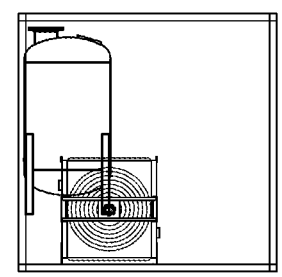

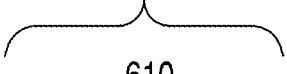
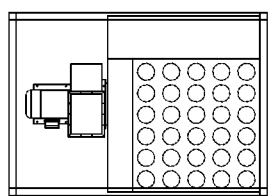
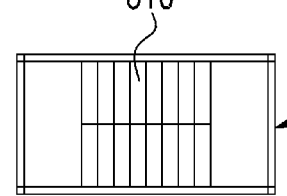
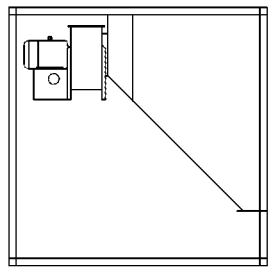
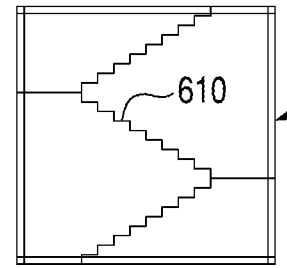
MODU-SKID #5
12,000 CFM DUST COLLECTOR
MODU-SKID #6
LADDER SKID

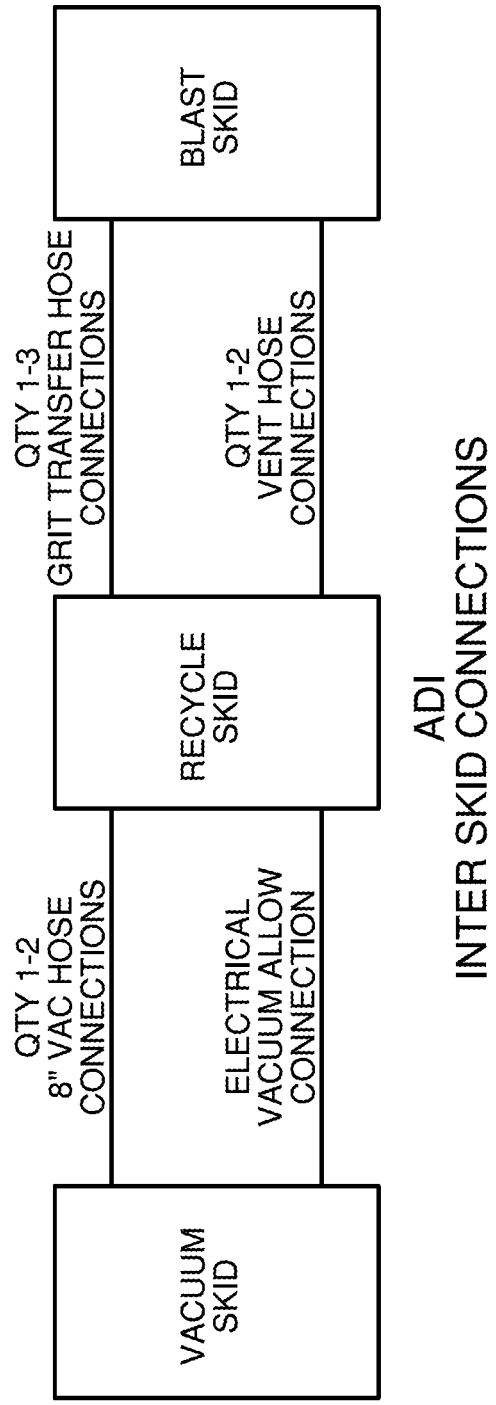

APPARATUS AND METHOD FOR PROVIDING A MODULAR ABRASIVE BLASTING AND RECOVERY SYSTEM

CROSS-REFERENCE TO RELATED APPLICATION

This application is a divisional of U.S. application Ser. No. 13/605,295 filed Sep. 6, 2012, which is now U.S. Pat. No. 8,961,270, issued on Feb. 24, 2015, the entire disclosure of which is incorporated herein by reference. The present invention also claims the benefit under 35 U.S.C. 119(e) of U.S. Provisional Patent Application Ser. No. 61/531,356 filed Sep. 6, 2011 by Roden, J. R., which is hereby incorporated herein by reference in its entirety and to which priority is claimed.

FIELD OF THE INVENTION

This present invention relates to devices and methods for abrasive particle blasting as well as cleaning, separating and reclaiming spent abrasive blasting material that have been employed during an abrasive blasting process in general and, more particularly, to a system for providing modular and stackable abrasive particle blasting units and grit recycling systems.

BACKGROUND OF THE INVENTION

Abrasive blasting of steel structures, such as ships and highway bridges, is a necessary step in maintenance of structures. In particular, abrasive blasting is a precursor to repainting of steel structures. One particular problem encountered with structures such as bridges is that the past painting history of the structure typically will include a lead-based paint. Abrasive blasting tends to liberate lead dust from such structures. Lead dust however, is considered quite toxic and is increasingly regulated. One approach to controlling environmental contamination from the lead dust resulting from abrasive blasting is to recover all of the dust resulting from an abrasive blasting procedure. If the abrasive blasting is accomplished using sand particles, the lead dust ends up mixed with the sand particles. This results in an undesirably high quantity of hazardous waste for subsequent disposal. A more desirable alternative is to employ a reusable steel abrasive particle. Steel is denser than sand and therefore more effectively retains blasting energy.

The most commonly used type of abrasive blasting media currently used is silica sand, fine glass beads, steel shot, steel grit, stainless steel shot, cut wire, grit or similar sized pellets, etc. It is possible to repeatedly use the same abrasive blasting material (or media) several times, if the abrasive blasting material is properly cleaned between each use.

One consequence of the abrasive blasting process on the abrasive blasting materials resulting from high velocity impacting on steel surfaces being cleaned causes them to abrade and generate contaminants such as dirt, paint, mill scale, and rust from the treated surface. At the same time a certain amount of fractured, fine abrasive particles (dust) is also produced.

Various types of devices for cleaning and reclaiming spent abrasive blasting media are available in the related art. Typically, in such a device, the used abrasive blasting media is vacuumed up and carried in an airstream to a cleaning and separating device. Lightweight contaminants are removed by air-washing, while large particulate contaminated material is separated by a separating device.

While known devices for cleaning and reclaiming spent abrasive blasting media have proven to be acceptable for various abrasive blasting media cleaning and reclaiming applications, such devices are nevertheless susceptible to improvements that may enhance their performance, applicability, cost and attractiveness. With this in mind, a need exists to develop a modular approach for arranging different components of the blast skid, recycle skid and vacuum skid as well as other components related to the blasting process.

SUMMARY OF THE INVENTION

A modular abrasive particle blasting system comprises an abrasive blast assembly including at least one blast vessel for delivering blast particles to an abrasive blasting system, said abrasive blast assembly being mounted within a first skid; an abrasive recycling assembly including at least one vacuum hopper for receiving grit retrieved from an abrasive blasting process, said abrasive recycling assembly being mounted within a second skid; wherein said first and second skids comprising mounting members at a top section and a bottom section of each of said first and second skids to permit mounting of said first and second skids in alternate stacked arrangements whereby said first skid is selective mounted above and below said second skid.

The modular abrasive particle blasting system further comprises an abrasive vacuum assembly including a vacuum dust collector, said abrasive vacuum assembly being mounted within a third skid, wherein said third skid comprises additional mounting members to permit said third skid to be selectively mounted above and below at least one of said first and second skids.

The modular abrasive particle blasting system according to the invention provides a modular blast assembly and a modular recycling assembly which are interconnected by pneumatic hoses. The individual skids are dimensioned the same to mates with each other.

With the structure of the skids as described above, it is possible to provide modular units of abrasive blasting and recovery which may be stacked or disposed side-by-side. In the preferred embodiment, the modular skids are interconnected by hoses therefore the different skids may be disposed in any stacked arrangement with the blast skid being above or below the recycle skid. Additionally all three skids may be stacked in any order and additional skids may be provided. Likewise, the same modular skids may be set side-by-side and interconnected by hoses during use and operation.

It is also noted that while the above description shows only three skids, the present invention is not limited to the specific structure and additional skids may be provided. For example, the present invention may be modified to include a blast skid, a vacuum skid, a recycle skid, a storage skid, an air dryer skid, a dust collector skid and or a dehumidification skid. Likewise, a ladder skid may be provided to include a ladder to permit an operator to climb to a desired position adjacent the system skids mentioned above.

Other aspects of the invention, including apparatus, systems, methods, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 1 is a side elevational view of a mobile apparatus for separation and recovery of spent abrasive blasting material according to an exemplary embodiment of the invention;

FIG. 2 is a top plan view of the mobile apparatus of FIG. 1;

FIG. 20 is an exploded view of the stacked blast and recycle skids shown in FIG. 16;

FIG. 21a-21f are top and side views of different types of skids possible in accordance with the present invention;

FIG. 22 is a schematic showing the hose connections between the vacuum skid, the recycle skid and the blast skid described below.

Figure 3:
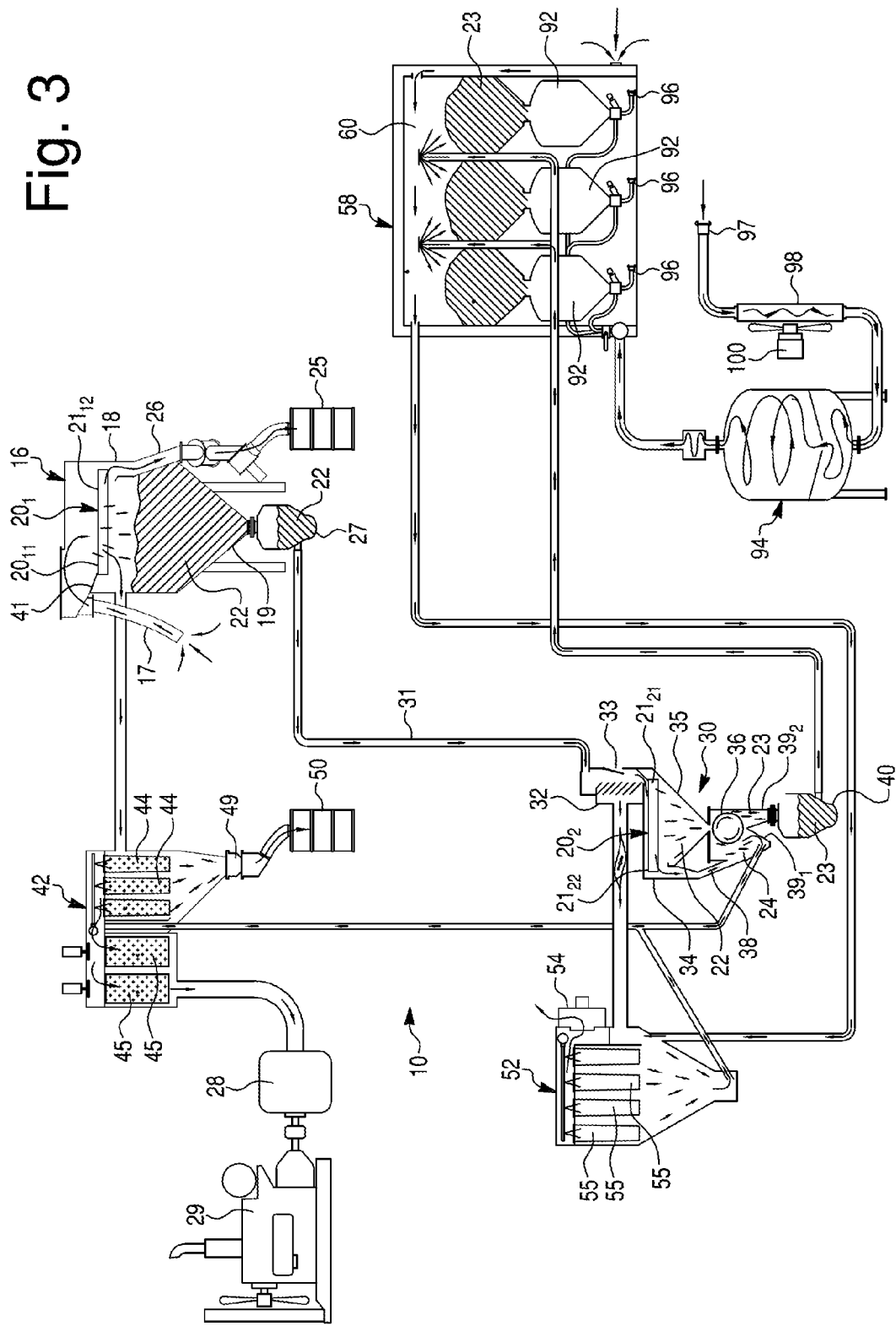
FIG. 3 is a schematic view of a process of cleaning, separating and reclaiming spent abrasive blasting material employing the mobile apparatus of FIGS. 1 and 2.

DETAILED DESCRIPTION OF EXEMPLARY
EMBODIMENTS AND EXEMPLARY METHODS

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one".

FIGS. 1-3 of the drawings illustrate a system and a process for separation and recovery (reclaiming, recycling) of used (or spent) abrasive blasting material (media) according to an exemplary embodiment of the present invention indicated generally by reference numeral 10. The system 10 is an abrasive blasting material recycling system that includes vacuum recovery, classification, and air blasting units. The system 10 has four major subsystems: vacuum, classification, compressed air dryer, and blasting, and a control panel 11. According to the conventional arrangement of the present invention, the apparatus 10 is a mobile apparatus in the form of a self-contained vehicle 12, such as a trailer, having one or more wheels and axle assemblies 14, one or more telescopically extensible trailer stabilizer arms 15 that may extend from the trailer 12 and can be deployed therefrom to support and stabilize the trailer 12 during the operation of the mobile apparatus 10. In accordance with the aspects of the present invention, the components of the system 10 are mounted within separate modular skids. In other words, the components of the apparatus 10 according to the exemplary embodiment of the present invention are mounted in modular skids as opposed to the conventional manner of mounting the components on a single trailer. In accordance with the present invention, the components of the mobile apparatus 10 are mounted on separate skids.

The apparatus 10 according to the exemplary embodiment of the present invention comprises a vacuum recovery unit 16. The vacuum recovery unit 16 includes a vacuum storage hopper (bin) 18 for receiving and storing (i.e., recovery of) spent or used, dirty abrasive blasting material, such as abrasive grit. The spent dirty (i.e., contaminated) abrasive blasting material, generally denoted with the reference numeral 22, is composed of the abrasive blasting material (media) 23 and various contaminants 24 including large contaminants (large trash items), paint chips and dust. It is desirable to remove the contaminants 24 from the contaminated abrasive blasting material 22 and recover clean abrasive blasting material 23 for reuse, as best shown in FIG. 3.

Figure 4:
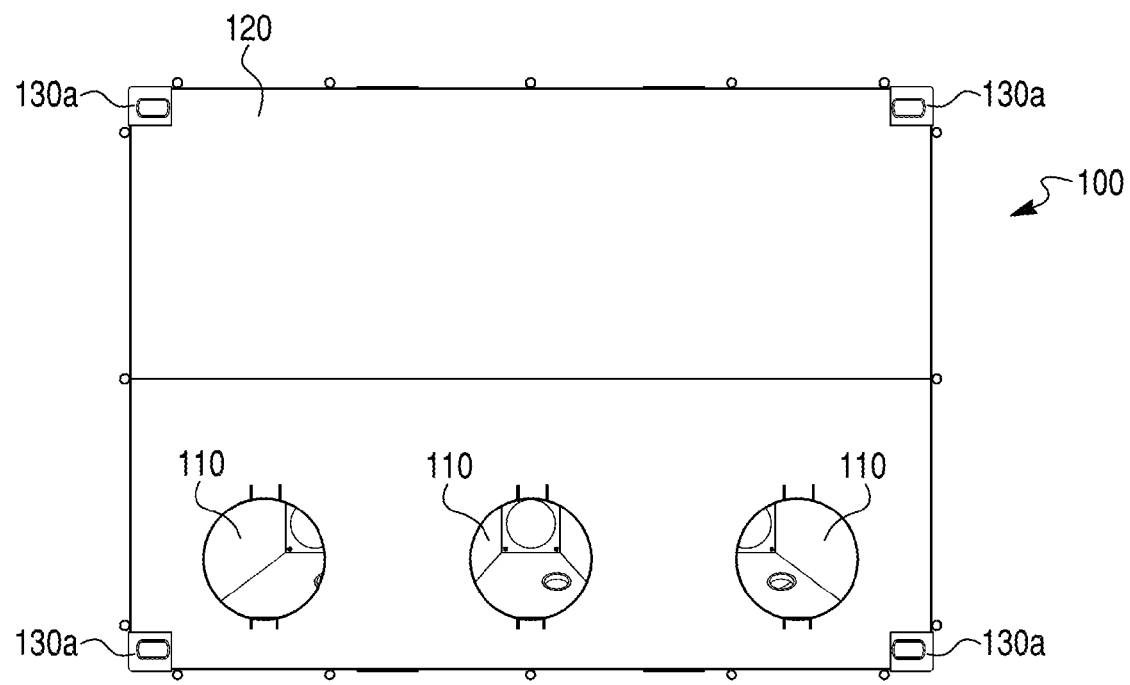
FIG. 4 is a top view of an exemplary blast skid.

The contaminated abrasive blasting material 22 is initially delivered into the vacuum recovery unit 16 via a vacuum pick-up 17. The vacuum pick-up 17 is in fluid communication with a vacuum pump 28 selectively powered by a prime mover 29, i.e. a machine that transforms energy from thermal, electrical or pressure energy to mechanical energy. In the exemplary embodiment of the present invention, the prime mover 29 is in the form of an internal combustion engine, such as a diesel engine. It will be appreciated that any other type of prime mover, such as an electric motor, is within the scope of the present invention. Both the vacuum pump 28 and the diesel engine 29 are mounted on the trailer 12. As illustrated in FIGS. 3 and 4, the vacuum recovery unit 16 further includes a first (or primary) screening device $20_1$ disposed in an upper portion of the vacuum storage hopper 18. The first screening device $20_1$ is provided with a screen having a plurality of holes, known as "mesh." The primary screening device $20_1$ is provided with the screen having oversized screen holes for screening (separating) and reclaiming the contaminated abrasive blasting material from large contaminants (or large trash items).

The dirty (dusty) air is removed from the vacuum storage hopper 18 to a vacuum dust collector 42 where the air is filtered by primary filters 44 and secondary filters 45, then passes through a vacuum tube 46 to the vacuum pump 28, where it is discharged into the atmosphere. The dust removed from the dirty air is deposited into a dust container 50 through a double dump dust discharge 49, shown in FIG. 3.

The apparatus 10 further comprises a classifier unit 30 in fluid communication with the vacuum recovery unit 16. The classifier unit 30 includes a dust separator 32 with an air wash intake 33, a second (or secondary) screening device $20_2$ disposed in an upper portion of classifier bin 34, and a magnetic drum separator 36 disposed downstream of the secondary screening device $20_2$. The classifier bin 34 has a funneled lower portion 35 with an outlet opening facing the magnetic separator 36. The magnetic separator 36 is disposed in a separator bin 38 located beneath (downstream) the classifier bin 34. The separator bin 38 includes a contaminant section $39_1$ and an uncontaminated section $39_2$.

After screening through the primary screening device $20_1$, the recovered contaminated abrasive blasting material 22 from the dirty grit transporter 27 is transported to the classifier unit 30 where it is de-dusted in the air wash of the dust separator 32, screened again in the secondary screening device $20_2$, passes over the magnetic drum separator 36, and is then transferred to a recycled grit storage hopper 40.

The contaminated abrasive blasting material 22 (in this case, the mixture of the abrasive blasting material and the remaining contaminates, separated by the secondary screening device $20_2$ from the medium-size contaminants) falls by gravity through the secondary screening device $20_2$ into the funnel-shaped lower portion 35 of the classifier bin 34. The medium-size contaminants, such as paint chips, are transported to and deposited into the contaminant section $39_1$ of the separator bin 38. The contaminated abrasive blasting material 22 (with the remaining contaminates but without the medium-size contaminants) is then deposited into the lower portion 35 of the classifier bin 34.

The magnetic separator 36 comprises a drum at least a portion of which is magnetized. Consequently, as the contaminated abrasive blasting material 22 is supplied to the magnetic separator 35, the magnetic contaminants 24 are separated therefrom and conveyed to the contaminant section $39_1$ of the magnetic separator bin 38, while the reclaimed (recycled), clean abrasive blasting material 23 is fed to the uncontaminated section $39_2$ of the magnetic separator bin 38. The recycled abrasive blasting material 23 (substantially without the contaminants, i.e., with negligible amount of contaminants, such as dust) is then deposited into the recycled grit storage hopper 40.

The dirty (dusty) air from the dust separator 32 is removed to a recycle collector 52 (using vacuum created by a recycle blower 54), where the air is filtered by filters 55, then passes to the vacuum dust collector 42 where the air is filtered, then discharged into the atmosphere. The dirty (dusty) air from the contaminant section $39_1$ of the magnetic separator bin 38 is removed from the contaminant section $39_1$ of the magnetic separator bin 38 to the vacuum dust collector 42 where the air is filtered by the primary filters 44 and secondary filters 45, then passes to the vacuum pump 28 where it is discharged into the atmosphere. The dust removed from the dirty air is deposited into a dust container 50, as best shown in FIG. 3.

The recycled (reclaimed) abrasive blasting material 23 is then transported to a blast pot unit 58 and deposited into a recycled grit storage hopper 60. The dirty (dusty) air from the recycled grit storage hopper 60 is removed to the recycle collector 52 where the air is filtered, then passes to the vacuum dust collector 42 where the air is filtered again, then discharged into the atmosphere. The blast pot unit 58 further includes a plurality of blast pots 92. The recycled (reclaimed) abrasive blasting material 23 stored in the recycled grit storage hopper 60 is loaded in to the blast pots 92 as needed. Compressed air from an external air compressor(s) passes through a compressed air dryer 94 where it is prepared for use in the blast pot unit 58 to propel the recycled abrasive blasting material 23 through hoses 96, where it is directed at steel and other substrates for corrosion, paint, and contaminate removal. The compressed air dryer 94 is connected to the external air compressor(s) via a compressed air connector 97. Before entering the compressed air dryer 94, the compressed air passes through a compressed air intercooler 98, which is provided with a cooling fan unit 100.

After being blasted, the spent abrasive blasting material 22 is vacuumed back into the vacuum recovery unit 16 to start the recycling process again.

While the components of the system 10 have been shown in FIGS. 1-3 in their conventional side-by-side arrangement, the present invention provides separate and modular skids for the different components of the abrasive blasting and recovery system 10.

Figure 5:
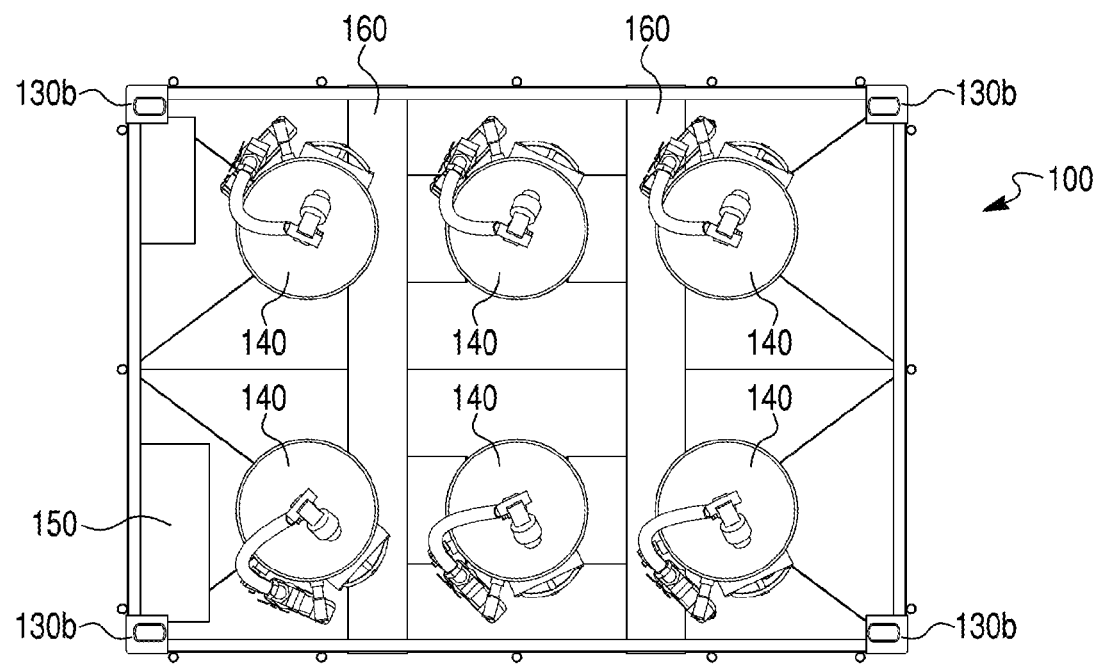
FIG. 5 is a bottom view of the blast skid of FIG. 4.
Figure 6:
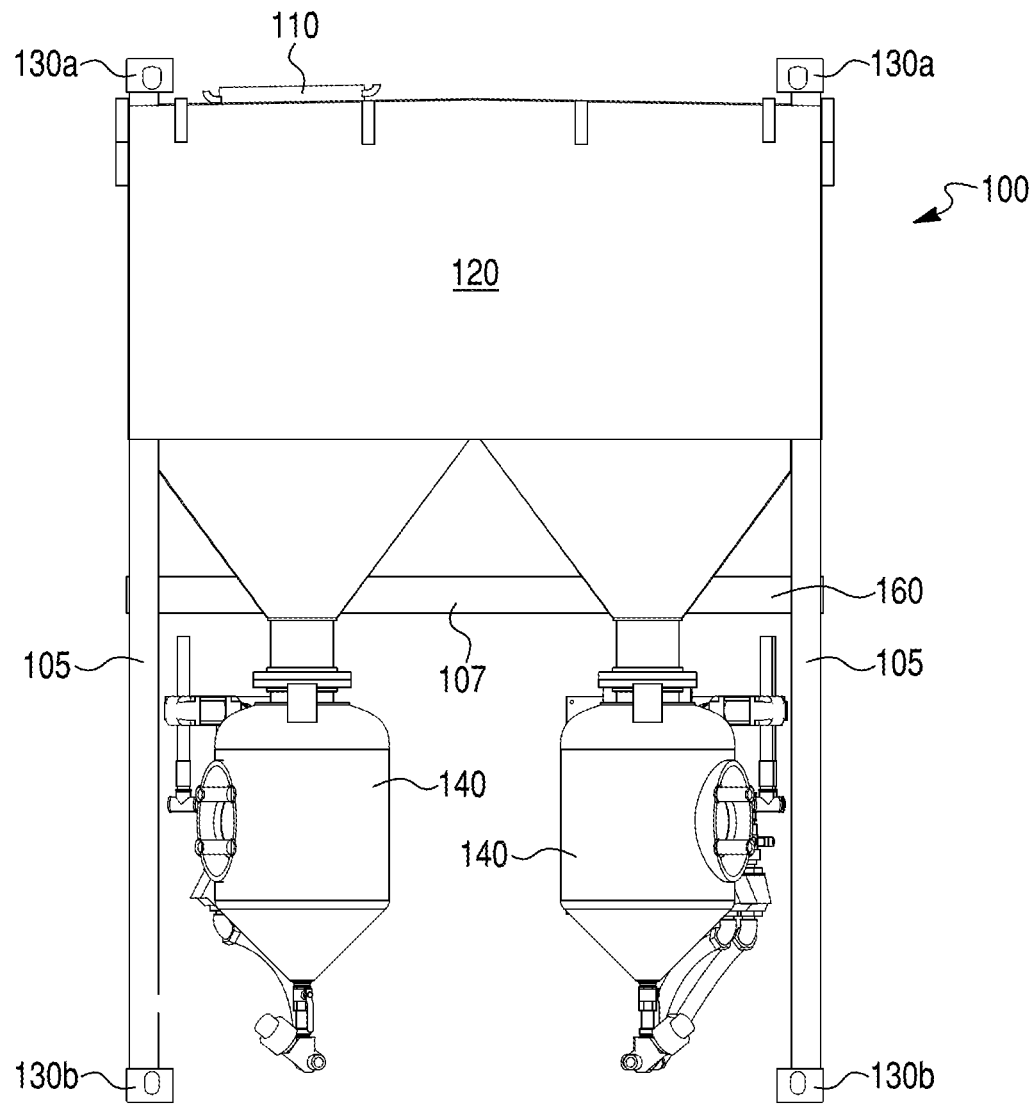
FIG. 6 is an end view of the blast skid of FIG. 4.
Figure 7:
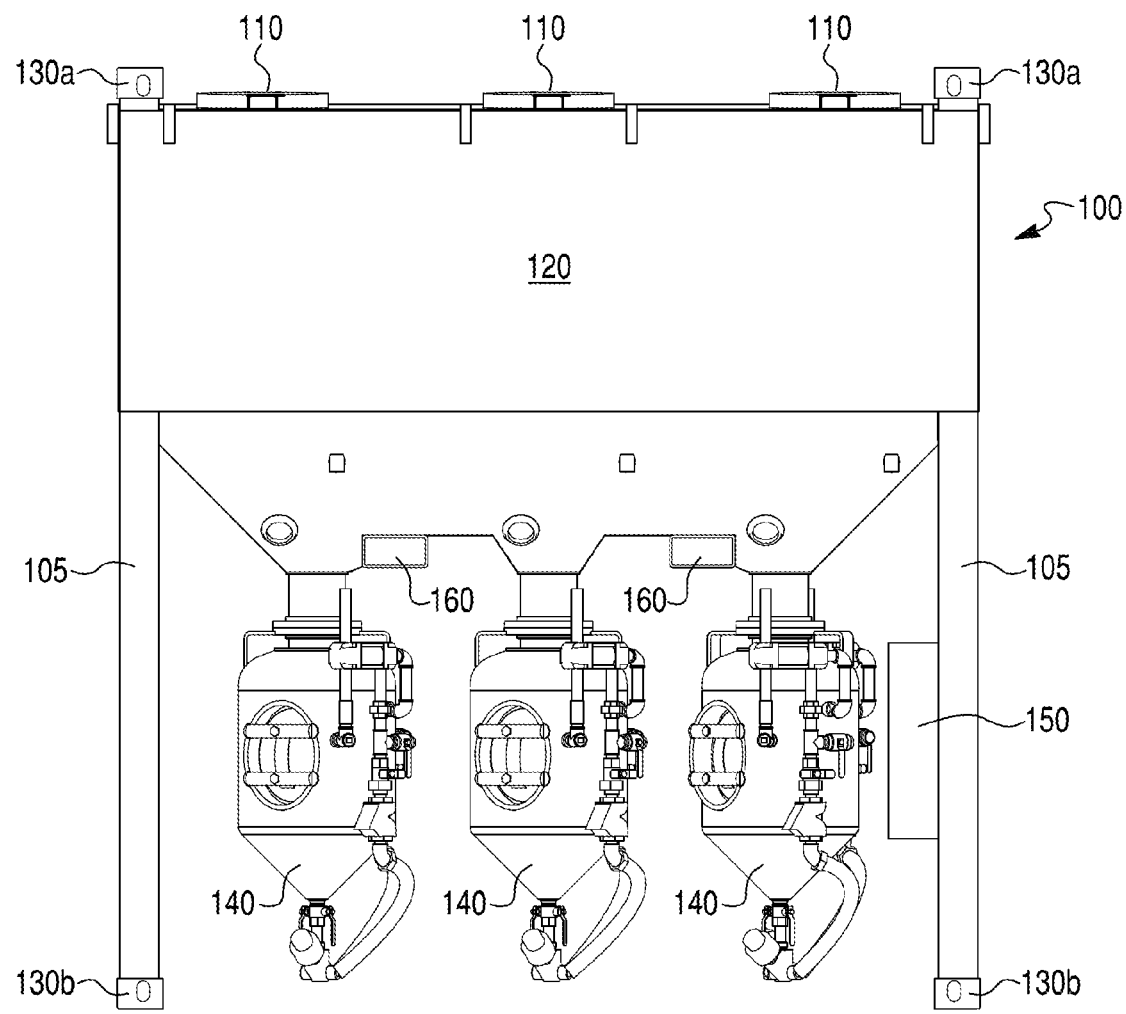
FIG. 7 is a side view of the blast skid of FIG. 4.

By way of example, a top view of a first skid 100; i.e., a blast skid, is illustrated in FIG. 4 and includes access ports 110 and shows a top of a grit or media storage hopper 120. FIG. 4 also shows four lift corners 130a of the first skid 100 which will be described in more detail below. FIG. 5 illustrates a bottom view of the first skid 100 and shows six blast pot vessels 140 and a control panel 150. FIG. 5 also shows optional fork lift pocket 160 to permit transport of the first skid 100 by a fork lift. FIG. 5 also shows four lift corners 130b of the first skid 100. FIG. 6 is an end view of the first skid 100 and shows the access ports 110, the media storage hopper 120 and blast vessels 140. FIG. 6 also illustrates the top lift corners 130a and the bottom lift corners 130b. The top and bottom lift corners 130a, 130b are fixed, preferably by welding, to the upright frame members 105 which are formed preferably of a steel of sufficient strength as known in the art. FIG. 7 is a side view of the first skid 100 shown in FIGS. 4-6. As shown in FIG. 7, the first skid includes the fork lift pockets 160, the media storage hopper, the access ports 110 and the control panel 150. Also shown in FIG. 7 are the top lift corners 130a and the bottom lift corners 130b. Again, the top and bottom lift corners 130a, 130b are fixed, preferably by welding, to the upright frame members 105 which are formed preferably of a steel of sufficient strength as known in the art. The first skid also includes lateral frame members 107 and preferably angled frame members (not shown).

Figure 8:
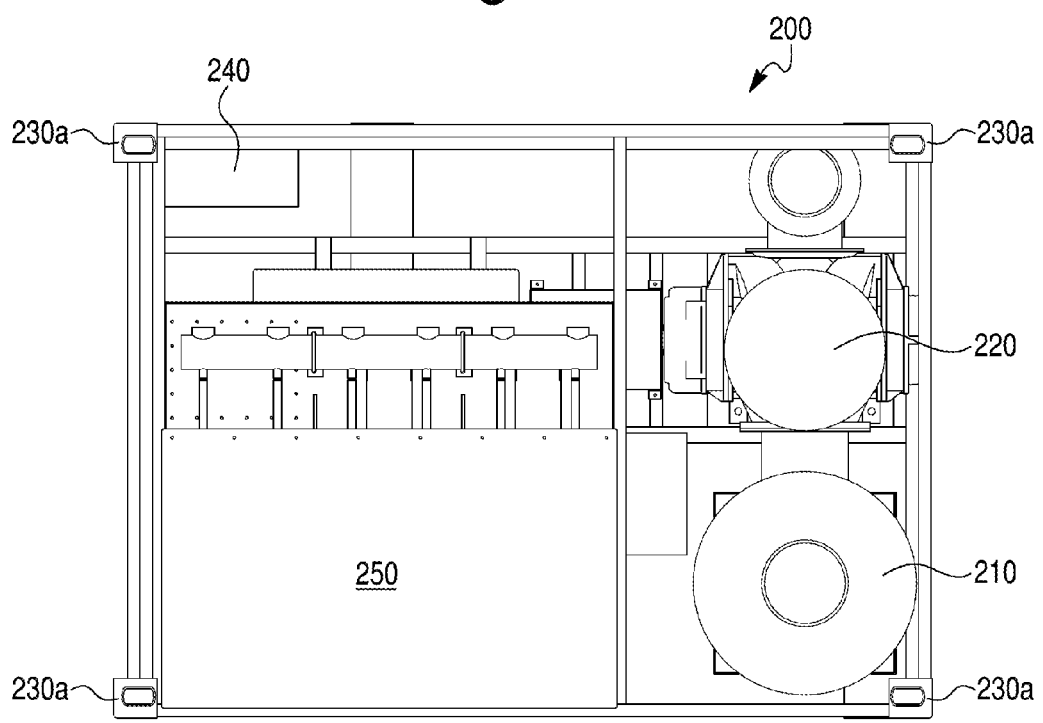
FIG. 8 is a top view of an exemplary vacuum skid.
Figure 9:
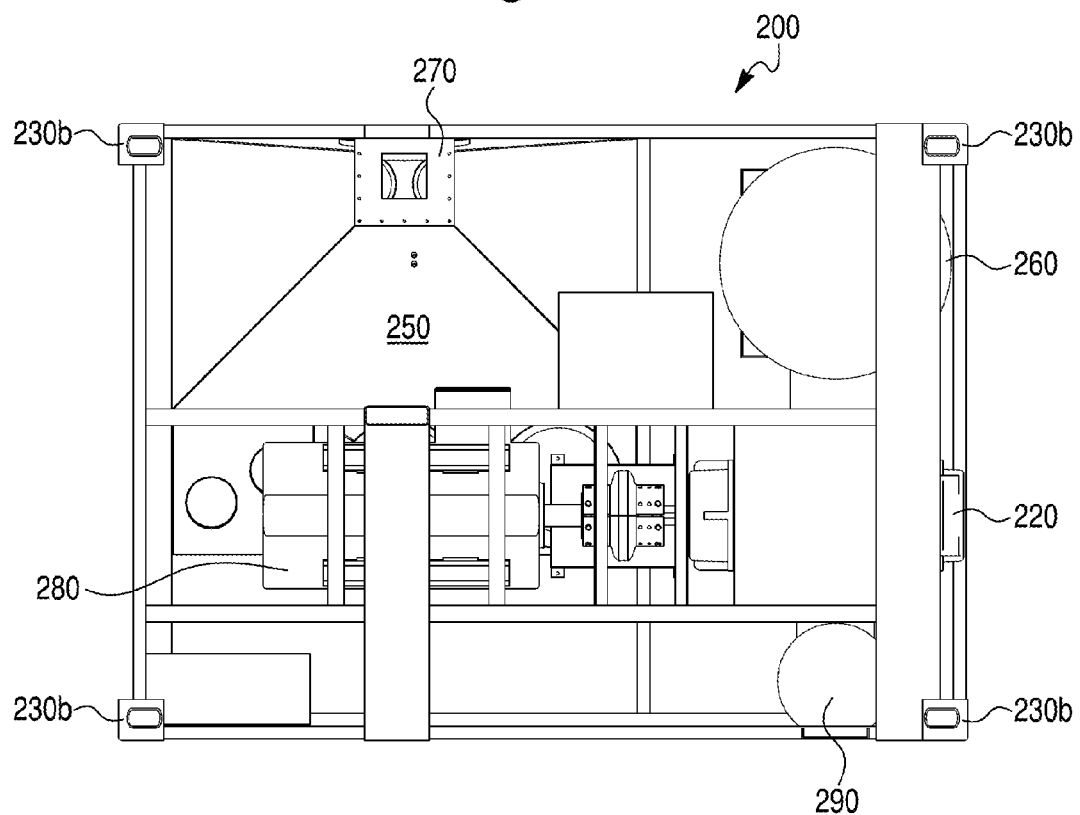
FIG. 9 is a bottom view of the vacuum skid of FIG. 8.
Figure 10:
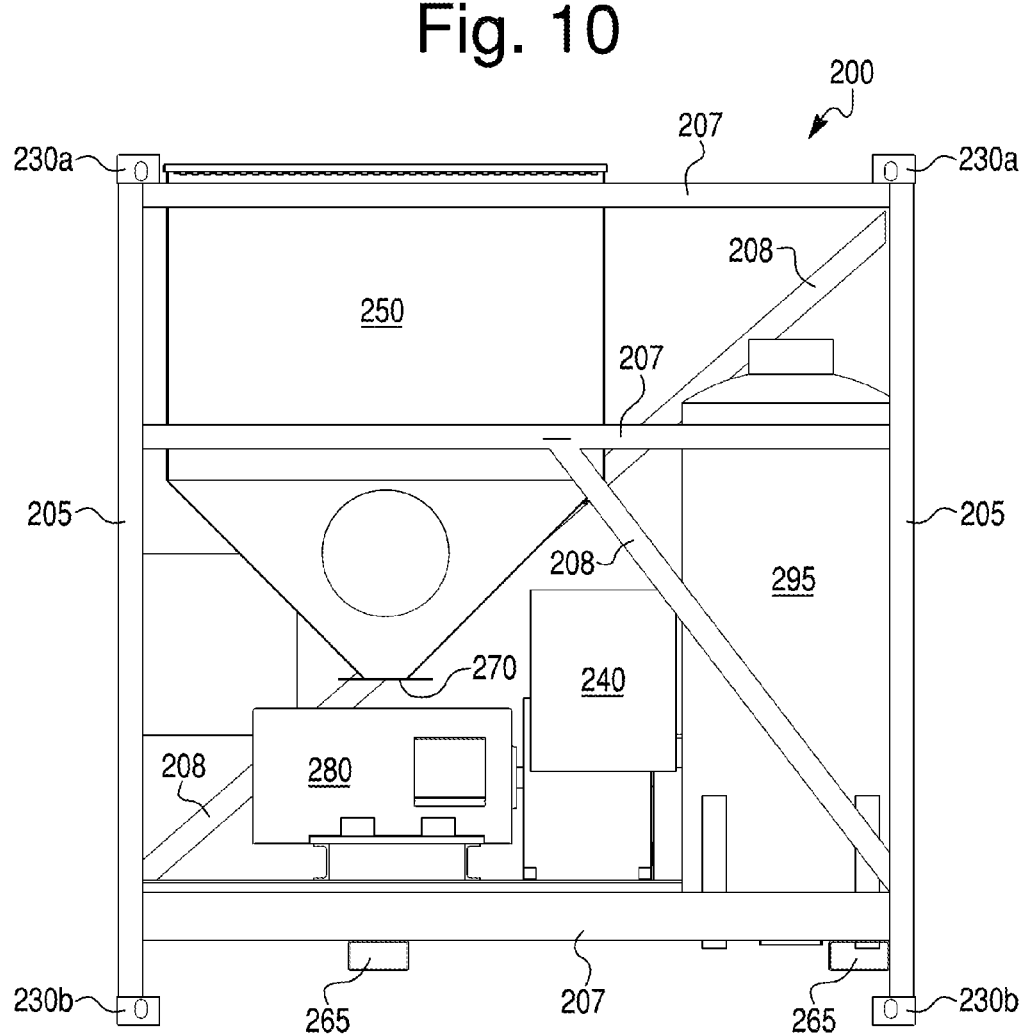
FIG. 10 is an end view of the vacuum skid of FIG. 8.
Figure 11:
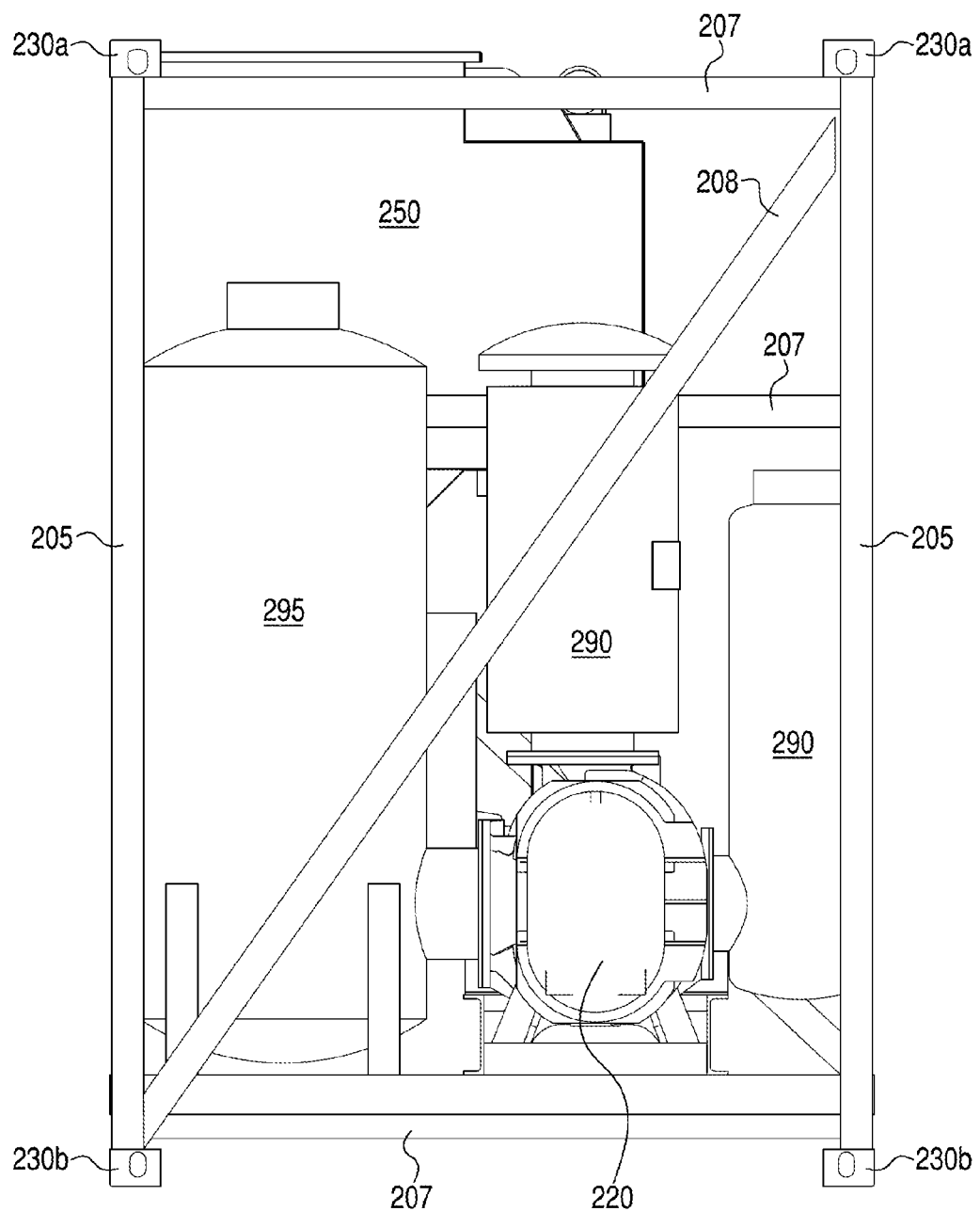
FIG. 11 is a side view of the vacuum skid of FIG. 8.

By way of example, a top view of a second skid 200; i.e., a vacuum skid, is illustrated in FIG. 8 and includes a vacuum exhaust 210, a vacuum blower 220, and a vacuum dust collector 250. Also shown is a control panel 240. In accordance with the present invention, the second skid 200 includes top lift corners 230a which are formed and shaped in the same manner as the top lift corners 130a of the first skid 100. FIG. 9 is a bottom view of the second skid 200 and shows the vacuum blower 220, the control panel 240, and the vacuum dust collector 250. FIG. 9 also illustrates a blower exhaust 260, a waste discharge 270, an electric motor 280, and a vacuum intake silencer 290. Notably, FIG. 9 shows the four bottom lift corners 230b of the second skid 200 which are formed and shaped in the same manner as the bottom lift corners 130b of the first skid 100. FIG. 10 is a side view of the second skid 200 and shows the control panel 240, the waste discharge 270, the electric motor 280, and the vacuum dust collector 250. Also shown in FIG. 10 is an exhaust silencer 295. As with the first skid 100, the second skid also includes fork lift pockets 265. FIG. 10 also illustrates the top and bottom lift corners 230a, 230b which are fixed by welding to upright frame members 205. The second skid also includes lateral frame members 207 and angled frame members 208. FIG. 11 is an end view of the second skid 200 and shows the vacuum blower 220, vacuum dust collector 250, the cooling air inlet silencer 290, and the exhaust silencer 295. The second skid 200 as shown in FIG. 11 includes the top and bottom lift corners 230a, 230b as well as the upright frame members 205 and lateral frame members 207.

Figure 12:
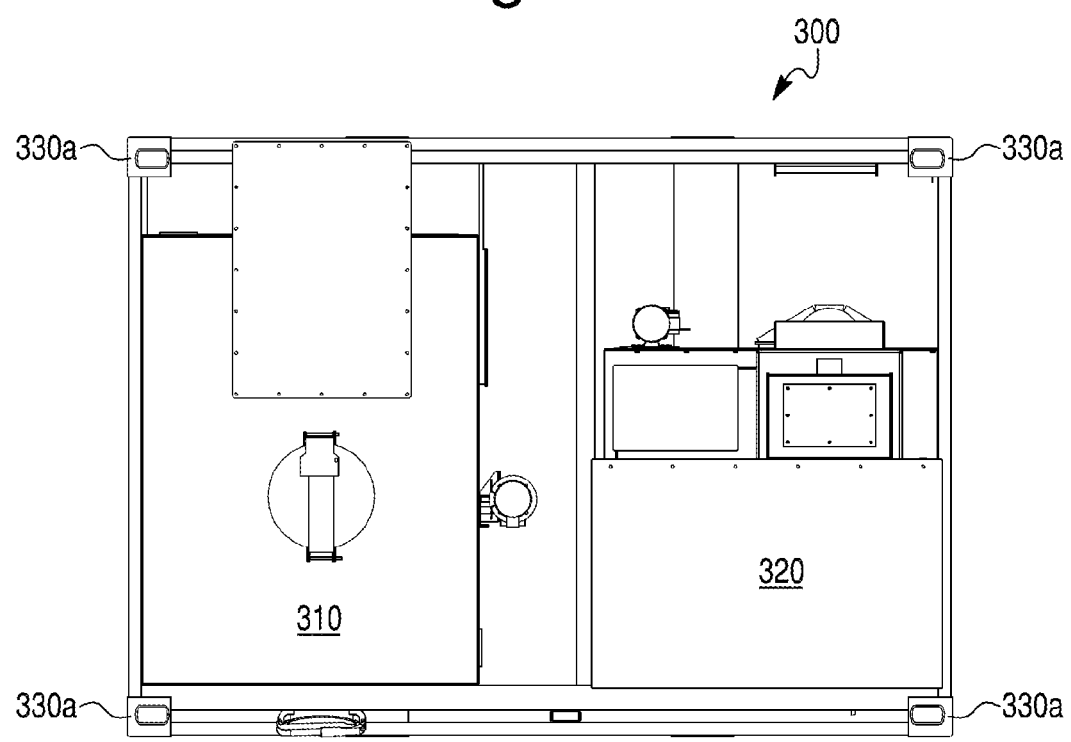
FIG. 12 is a top view of an exemplary recycle skid.
Figure 13:
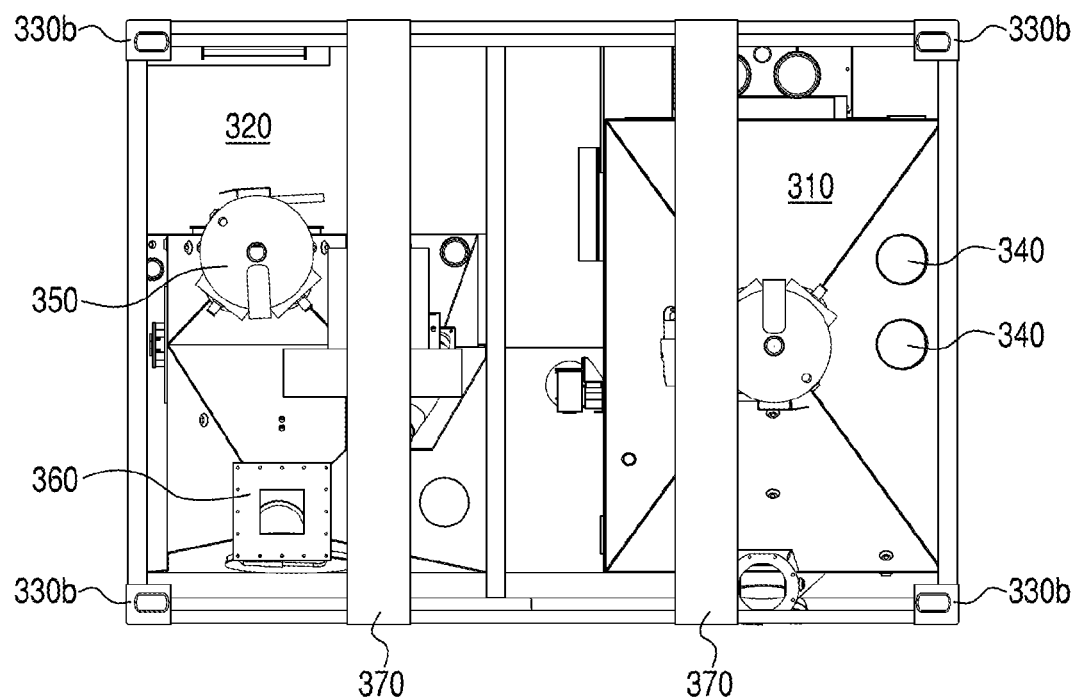
FIG. 13 is a bottom view of the recycle skid of FIG. 12.
Figure 14:
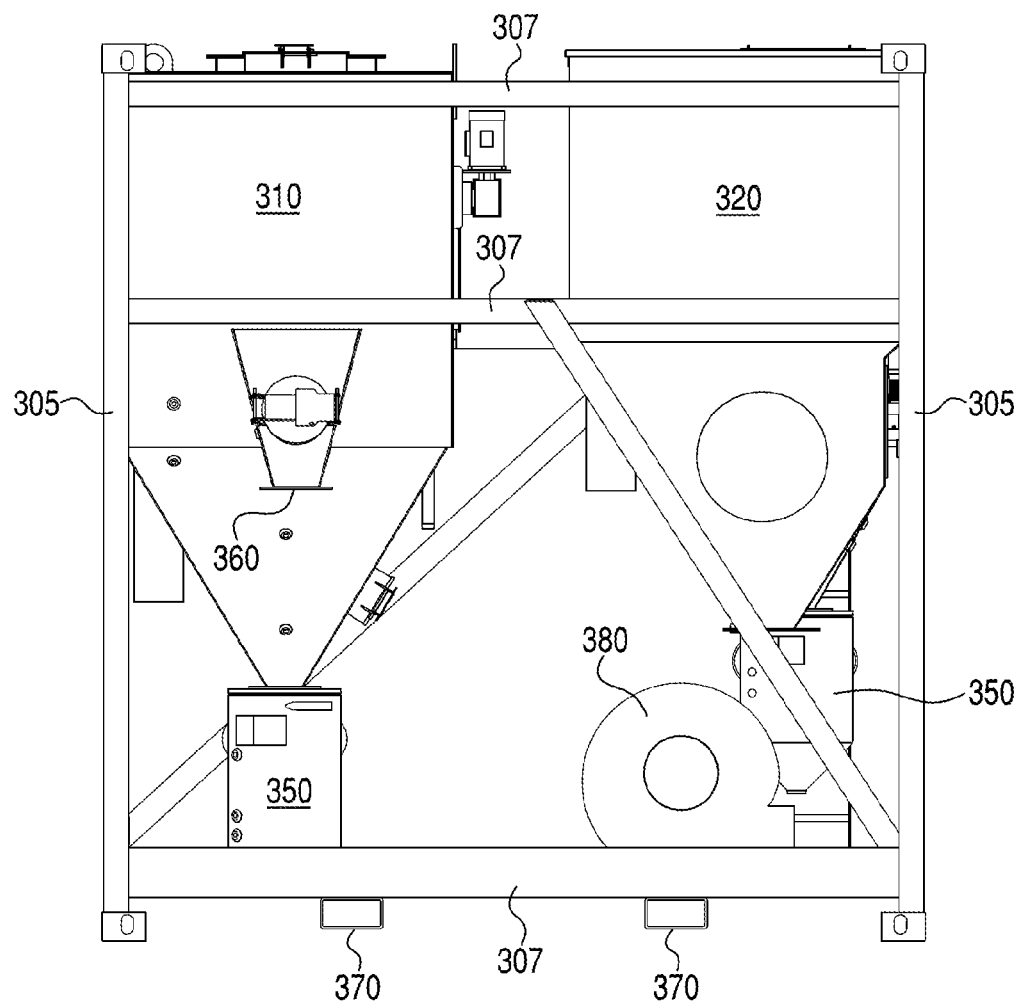
FIG. 14 is an end view of the recycle skid of FIG. 12.
Figure 15:
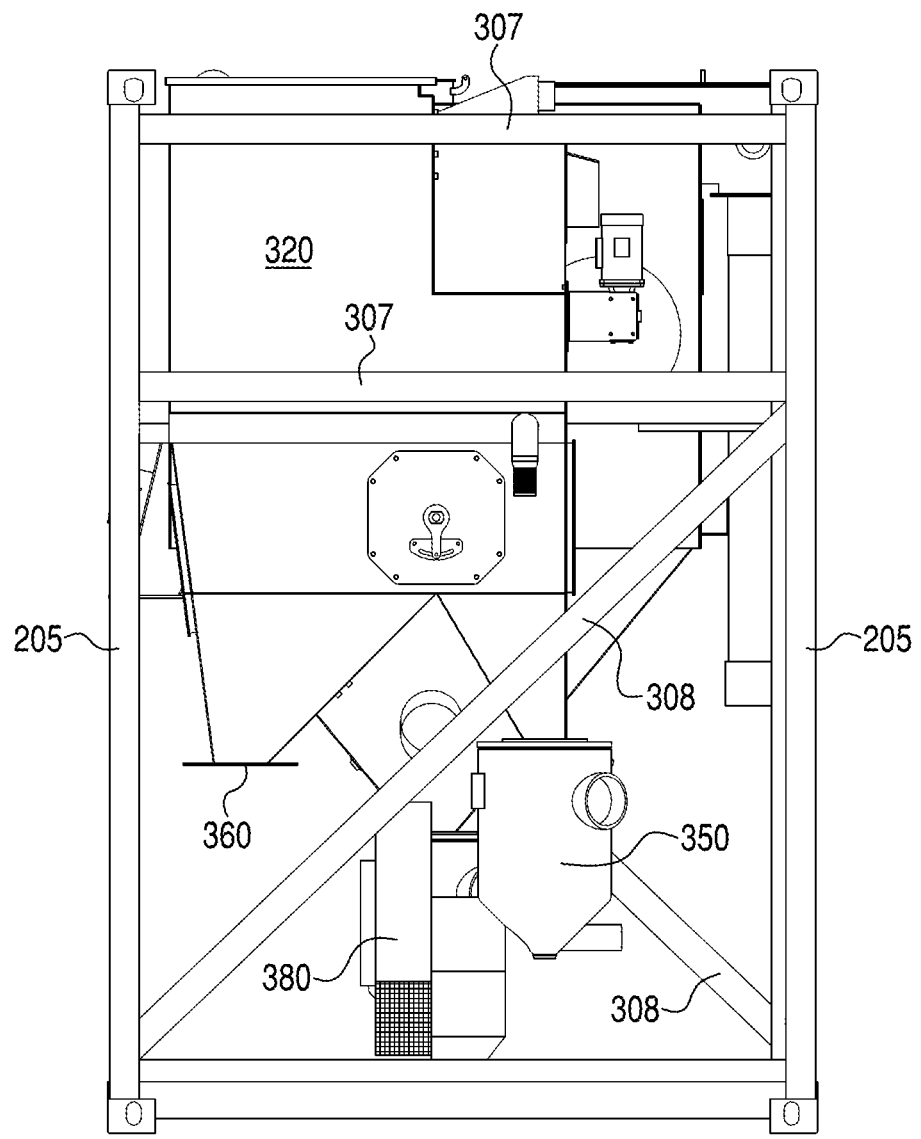
FIG. 15 is a side view of the recycle skid of FIG. 12.

FIG. 12 illustrates a top view of a third skid 300; i.e., a recycle skid 300. The third recycle skid illustrated in FIG. 12 includes a vacuum hopper with screen 310 and a media classifier 320 with screen, air wash and magnetic drum separator. As with the first and second skids 100, 200 the third skid includes top lift corners 330a. FIG. 13 is a bottom view of the third skid 300 and illustrates the classifier 320 and the vacuum hopper 310. FIG. 13 further illustrates vacuum source hose connections 340 as well as a grit transfer vessel 350 and a waste outlet 360. The third skid 300 further includes forklift pockets 370 and bottom corner lifts 330b. FIG. 14 is a side view of the third skid 300 and illustrates the classifier 320, the vacuum hopper 310, the waste outlet 360, and the grit transfer vessel 350. FIG. 14 also illustrates a classifier air wash fan 380 and the fork lift pockets 370. As with the structure of the first and second skids, the third skid includes the top and bottom lift corners 330a, 330b, upright frame members 305 and the lateral frame members 307. FIG. 15 is an end view of the third skid 300 and illustrates the air wash fan 380, the waste outlet 360, the magnetic drum separator and classifier 320 and grit transfer vessel 350. The structure of the skid 300 includes the upright frame members 305, lateral frame members 307 and angled frame members 308.

Figure 16:
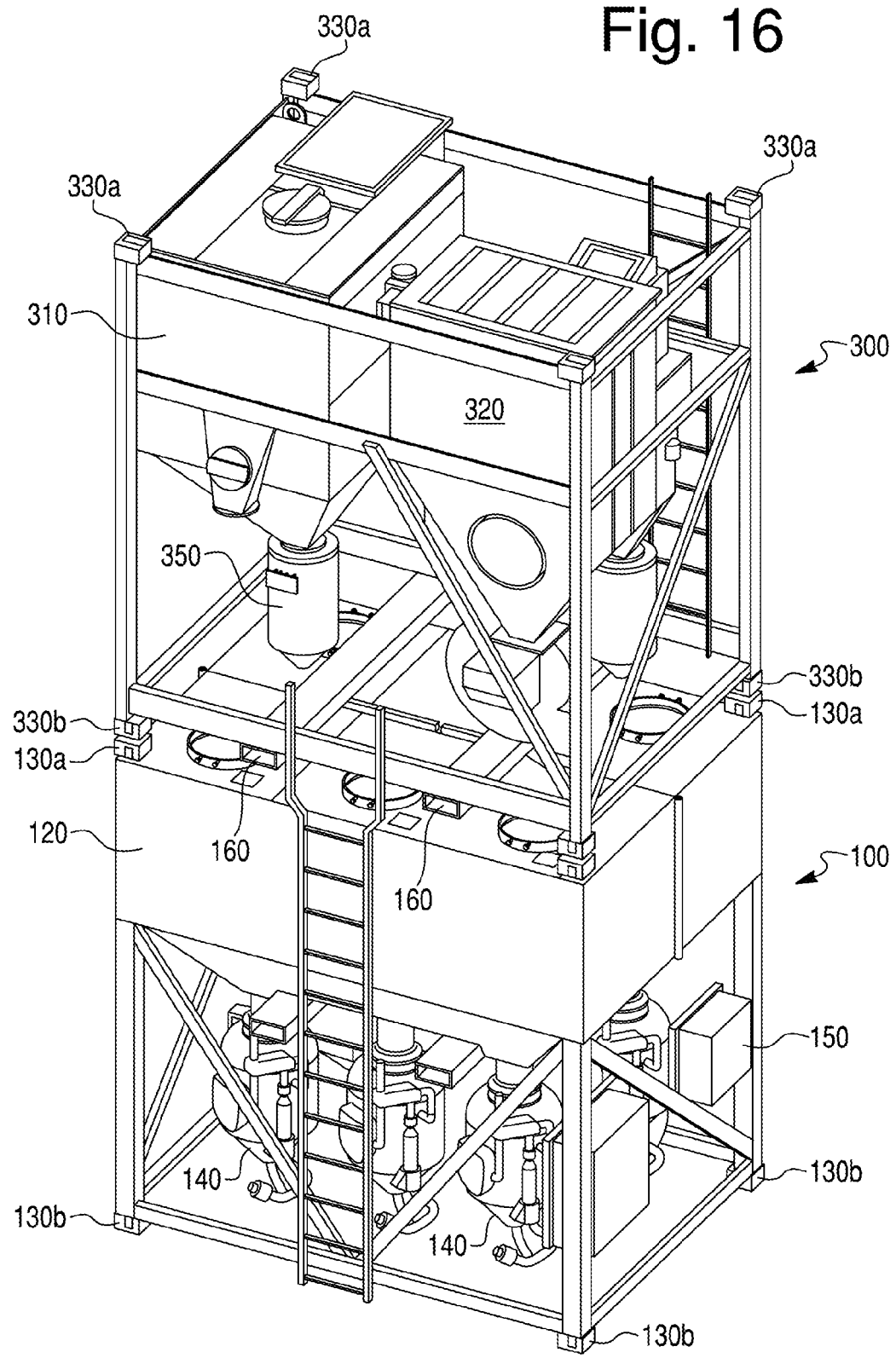
FIG. 16 is a perspective view of a blast skid shown in FIGS. 4-7 stacked on a recycle skid shown in FIGS. 12-15.
Figure 17:
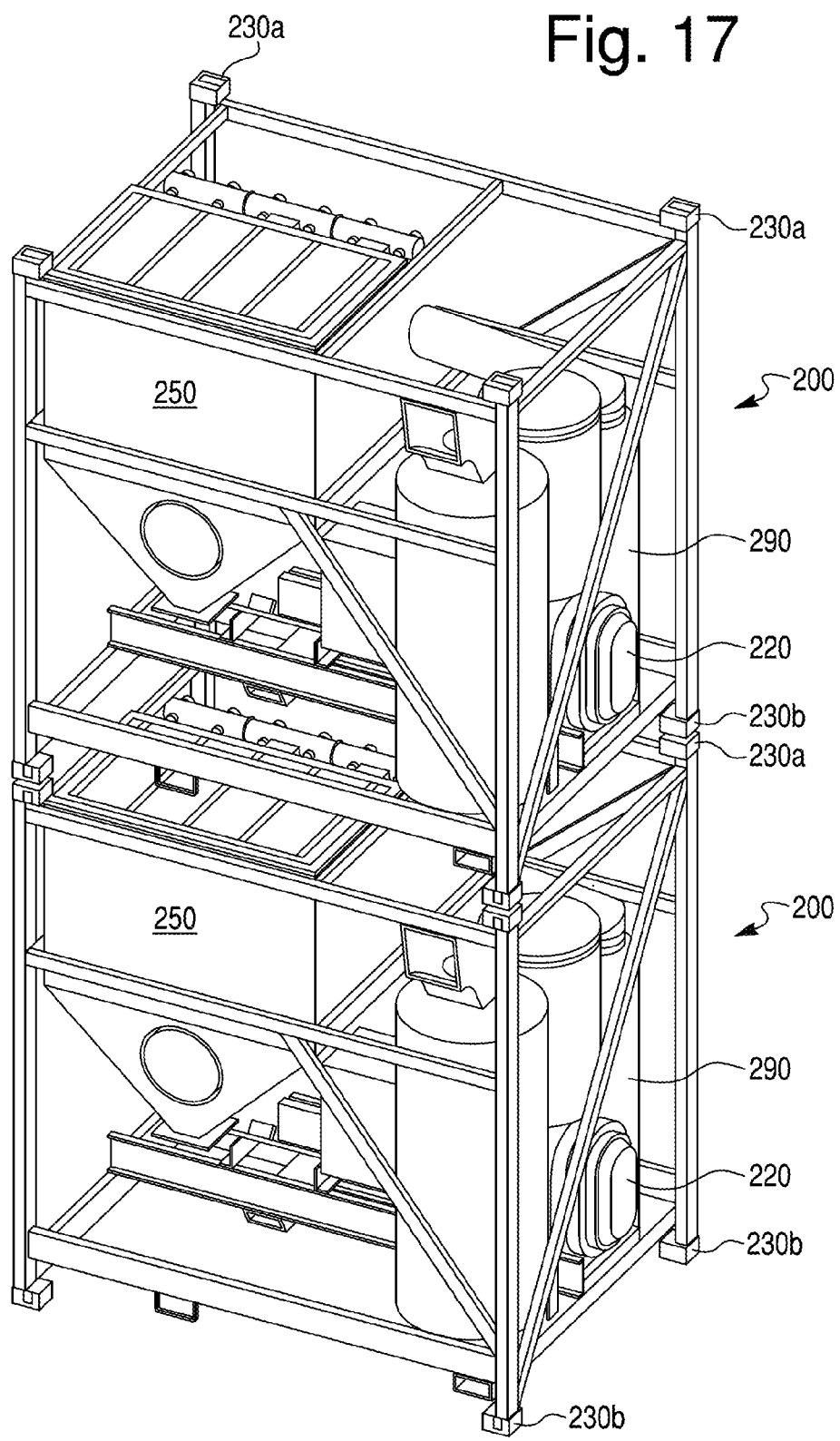
FIG. 17 is a perspective view of two vacuum skids as shown in FIGS. 8-11 stacked one on top of another.

In accordance with the primary purpose of the present invention, the skids 100, 200, 300 of FIGS. 4-15 provide a modular system whereby different components of the blasting and recovery system shown in FIGS. 1-3 may be stacked or disposed side-by-side depending on the environment of their use and deployment. For example, FIG. 16 shows one arrangement whereby the recycle skid 300 is stacked on top of the blast skid 100. Alternatively, FIG. 17 shows an arrangement whereby two vacuum skids 200 are stacked one on top of the other. Because these skids 100, 200, 300 are interconnected by hoses only, it is possible to either stacked these skids 100, 200, 300 as shown in FIGS. 16 and 17 or place these same skids side-by-side as illustrated schematically in FIG. 3.

Figure 18A:
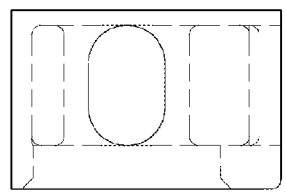
FIGS. 18a-18e are different views of the top and bottom lift corners shown in FIGS. 4-15.
Figure 18B:
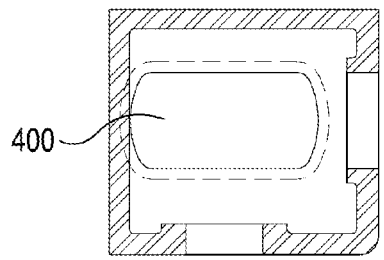
Figure 18C:
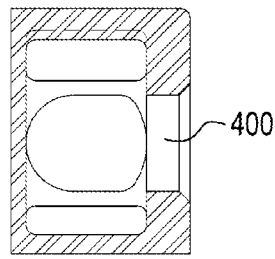
Figure 18D:
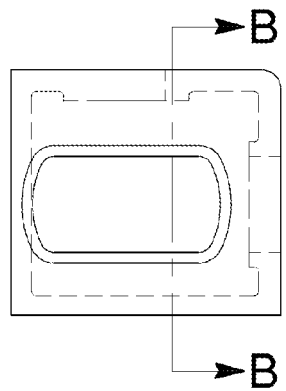
Figure 18E:
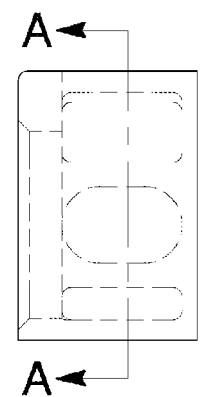
Figure 19A:
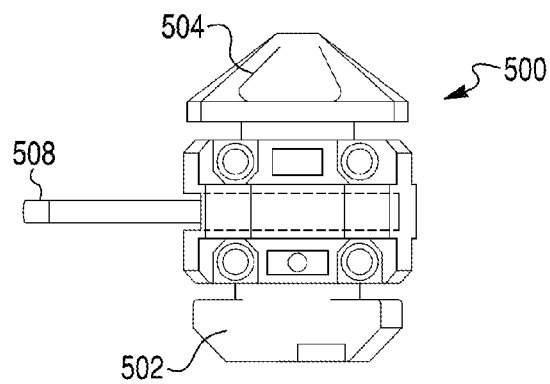
FIGS. 19a-19c are different views of the interlocking key which interconnects lift corners of stacked skids.
Figure 19B:
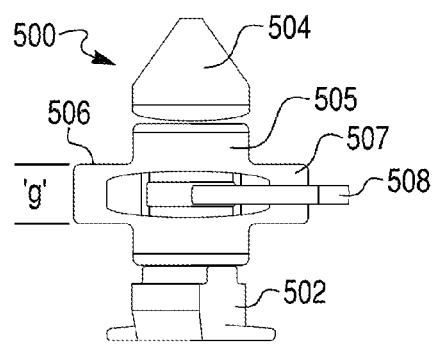
Figure 19C:
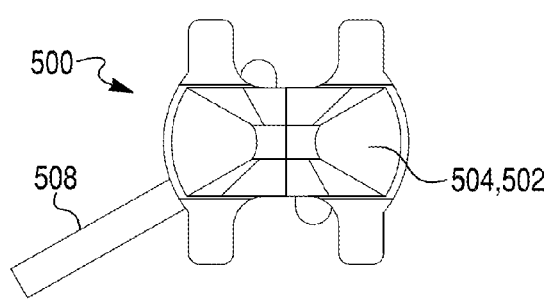

FIGS. 18a-18e show five different views of the lift corners 130a, 130b, 230a, 230b, 330a, 330b. When viewed from the top and bottom as shown in FIGS. 18d and 18b, the lift corner has an oblong opening 400 adapted to receive an interlocking key element 500 shown in FIGS. 19a-19e. As shown in FIG. 20, a blast skid 100 is located then the interlocking key 500 is inserted into the oblong opening 400 of the lift corners 130a; i.e., the lower (oblong) cone element 502 is inserted into oblong opening 400. The interlocking key has a main body 505 formed with bearing legs 506, 507 which come to rest on the lower skid 100. The cones 502, 504 are adapted to rotate with respect to the main body 505. Next, the recycle skid 300 is lifted (by a crane or other lifting device) above the blat skid 100 and lowered onto the blast skid 100 so that the top (oblong) cone element 504 of the interlocking key 500 is received into a corresponding oblong opening 400 of each lift corner 330b of the recycle skid 300. The upper skid 300 comes to rest on the bearing legs 506, 507 to maintain a gap "g" between the skids 100, 300. Once the top skid 300 is correctly positioned on the lower skid 100, the interlocking key is rotated via handle 508 so that the oblong cone is rotated. Upon rotation of the oblong cones 502, 504, the interlocking key is locked in place because the oblong cones are within the lift corners and rotated so that the oblong shape of the cones 502, 504 is no longer aligned with the oblong opening 400 of the lift corners. Like a key into a lock, once turned, e.g. 90 degrees, the interlocking key 500 is fixed within the lift corners.

With the structure of the skids as described above, it is possible to provide modular units of abrasive blasting and recovery which may be stacked or disposed side-by-side. In the preferred embodiment, the modular skids 100, 200, 300 are interconnected by hoses therefore the different skids 100, 200, 300 may be disposed in any stacked arrangement with the blast skid 100 being above or below the recycle skid 300. Additionally all three skids 100, 200, 300 may be stacked in any order. Likewise, the same modular skids may be set side-by-side and interconnected by hoses during use and operation.

It is also noted that while the above description shows only three skids, the present invention is not limited to the specific structure and additional skids may be provided. For example, the present invention may be modified to include a blast skid, a vacuum skid, a recycle skid, a storage skid, an air dryer skid, a dust collector skid and or a dehumidification skid. Likewise, a ladder skid 600 may be provided to include a ladder 610 to permit an operator to climb to a desired position adjacent the system skids mentioned above. FIGS. 21a-21f show top and side views of an exemplary blast skid (FIG. 21a), a vacuum skid (FIG. 21b), a classifier skid (FIG. 21c), an air dryer skid (FIG. 21d), a dust collector skid (FIG. 21e), and a ladder skid 600 (FIG. 21f). Of course the exact mechanical components provided within each skid may be modified and varied depending on the intended use and purpose to be achieved by the operator. However, each skid is sized (11'×12') to match one another so that each skid may mate with a corresponding skid.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:
1. A method for providing a modular abrasive particle blasting system, said method comprising the steps of:
    providing a first skid, said first skid comprising mounting members at a top section and a bottom section of said first skid;

mounting an abrasive blast assembly within said first skid, said abrasive blast assembly including at least one blast vessel for delivering blast particles to an abrasive blasting system;

providing a second skid, said second skid comprising mounting members at a top section and a bottom section of said second skid;

mounting an abrasive recycling assembly within said second skid, said abrasive recycling assembly including at least one vacuum hopper for receiving grit retrieved from an abrasive blasting process;

mounting said first skid with said abrasive blast assembly selectively above or below said second skid with said abrasive recycling assembly.

* * * * *